US010991016B2

(12) United States Patent
Nelson et al.

(10) Patent No.: US 10,991,016 B2
(45) Date of Patent: Apr. 27, 2021

(54) SYSTEM AND METHOD FOR REAL-TIME INTEGRATED CREDIT CARD MANAGEMENT

(71) Applicant: Blackbaud, Inc., Charleston, SC (US)

(72) Inventors: Deborah Nelson, Daniel Island, SC (US); David Vroblesky, Mt. Pleasant, SC (US); Nicole Guernsey, Daniel Island, SC (US); Julia Petit, Mt. Pleasant, SC (US); David Epner, Charleston, SC (US); Stephen Boyle, Mt. Pleasant, SC (US); Beth Kesser, Daniel Island, SC (US); Gautam Chawla, Daniel Island, SC (US); Rakesh Garg, Daniel Island, SC (US); Thomas Walker, North Charleston, SC (US)

(73) Assignee: Blackbaud, Inc., Charleston, SC (US)

( * ) Notice: Subject to any disclaimer, the term of this patent is extended or adjusted under 35 U.S.C. 154(b) by 130 days.

(21) Appl. No.: 16/271,611

(22) Filed: Feb. 8, 2019

(65) Prior Publication Data

US 2019/0244263 A1 Aug. 8, 2019

Related U.S. Application Data

(60) Provisional application No. 62/628,087, filed on Feb. 8, 2018.

(51) Int. Cl.
*G06Q 30/00* (2012.01)
*G06Q 30/04* (2012.01)
*G06F 3/0484* (2013.01)

(52) U.S. Cl.
CPC ......... *G06Q 30/04* (2013.01); *G06F 3/04847* (2013.01)

(58) Field of Classification Search
CPC ............................ G06Q 30/04; G06F 3/04847
USPC ...................................... 705/16, 34
See application file for complete search history.

(56) References Cited

U.S. PATENT DOCUMENTS

| | | | |
|---|---|---|---|
| 6,343,279 B1 | 1/2002 | Bissonette et al. |
| 7,720,702 B2 | 5/2010 | Fredericks et al. |
| 7,974,892 B2 | 7/2011 | Fredericks et al. |
| 8,001,020 B2 | 8/2011 | Hahn et al. |
| 8,140,361 B2 | 3/2012 | Fredericks et al. |
| 8,204,824 B2 | 6/2012 | Knowles et al. |
| 2001/0047336 A1 | 11/2001 | Maycock, Jr. et al. |

(Continued)

*Primary Examiner* — Rokib Masud
(74) *Attorney, Agent, or Firm* — Gregory Finch; Finch Paolino, LLC

(57) ABSTRACT

A method and system for managing a plurality of credit card transactions within an integrated accounting environment. Embodiments of the present disclosure enable integration between financial institutions, organizational accounting systems, and disparate user workflows to overcome deficiencies of the prior art. Specific embodiments enable tracking of credit card charges, credits, and payments directly within an accounts payable interface, enabling the ability to view activity on the credit card account record, register, and vendor record. Methods and systems are operable to establish a real-time data transfer protocol between a financial institution and an organizational accounting application to integrate transaction data in real-time, define vendor association for transactions, and create a real-time credit card register to drive decision making across disparate user roles.

20 Claims, 6 Drawing Sheets

(56) References Cited

U.S. PATENT DOCUMENTS

| | | |
|---|---|---|
| 2005/0033694 A1 | 2/2005 | Perrin |
| 2005/0108117 A1 | 5/2005 | Newman |
| 2012/0150572 A1* | 6/2012 | Fredericks ............ G06Q 10/02 |
| | | 705/5 |
| 2015/0363776 A1* | 12/2015 | Gomez ................. G06Q 20/40 |
| | | 705/44 |

* cited by examiner

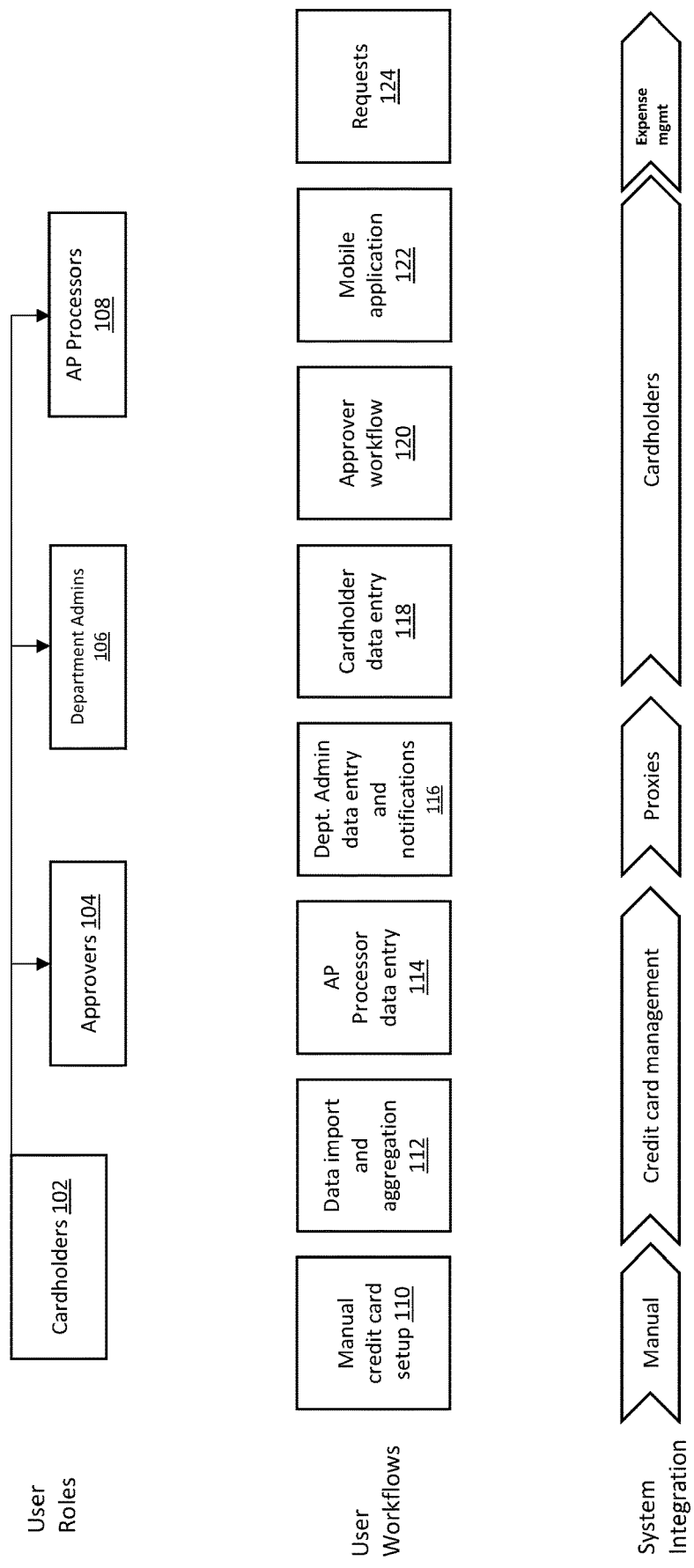
FIGURE 1: Functional Block Diagram (100)

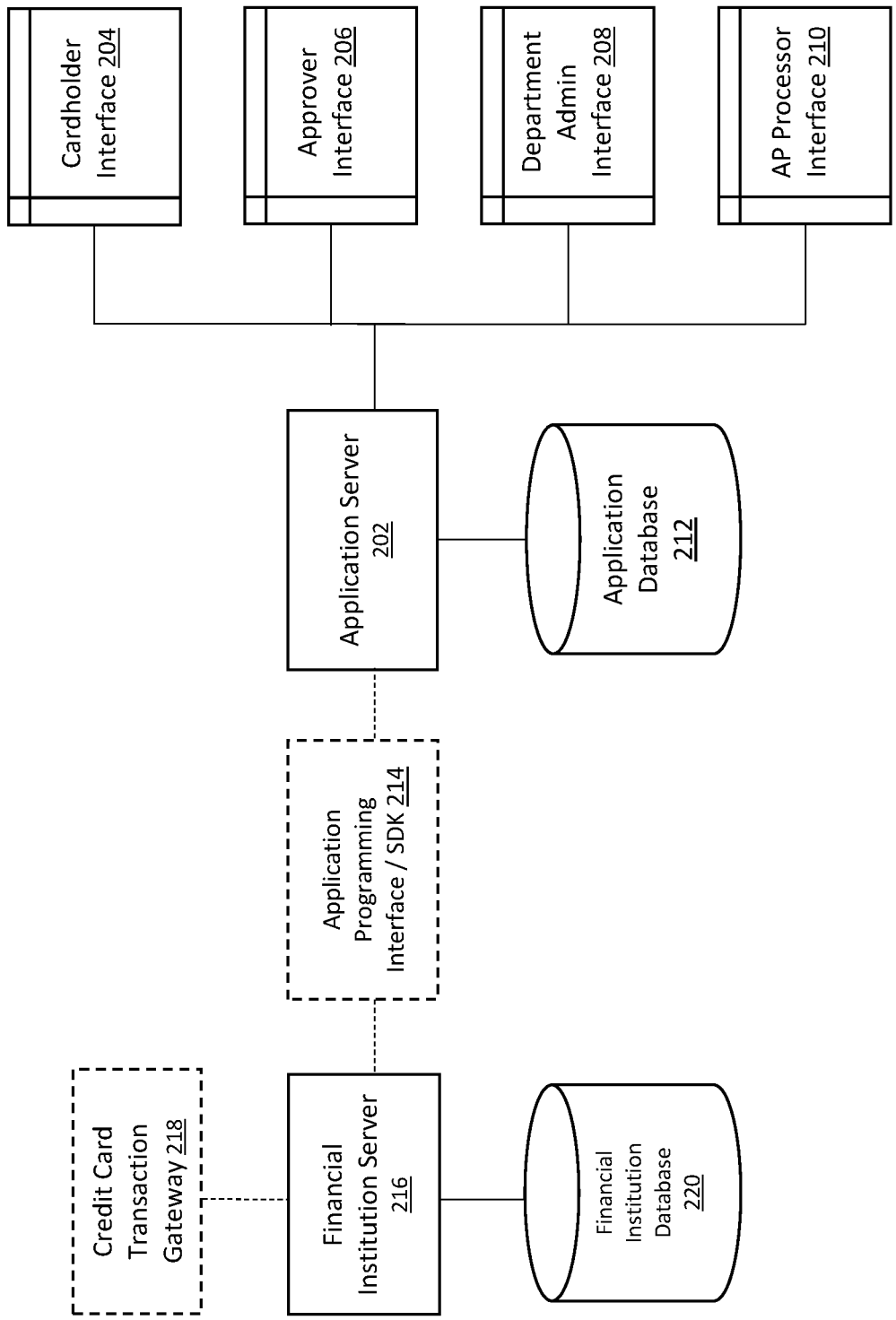

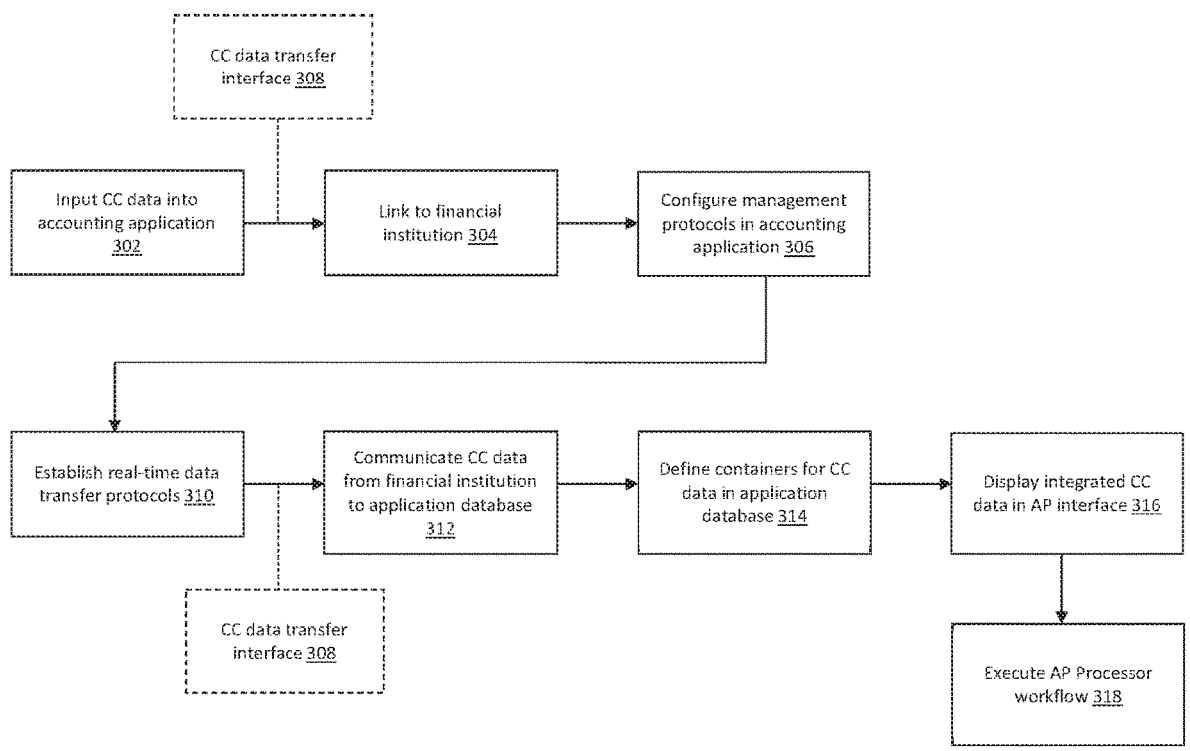

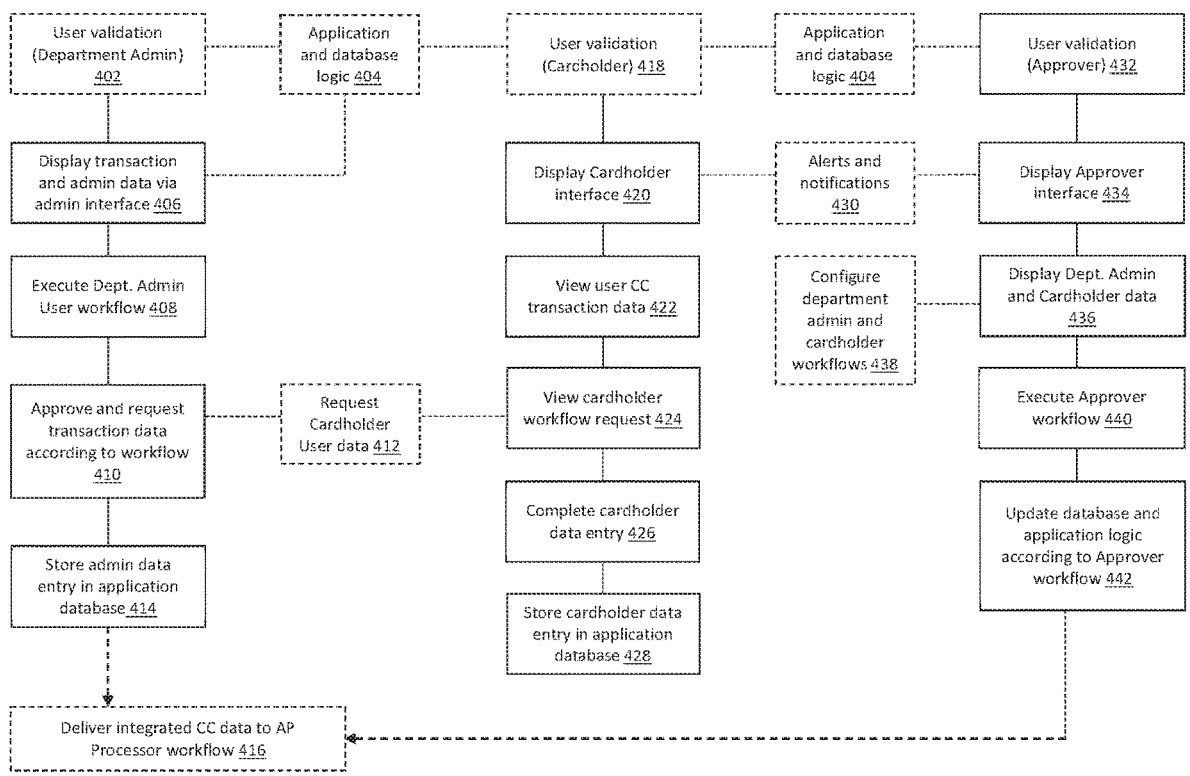

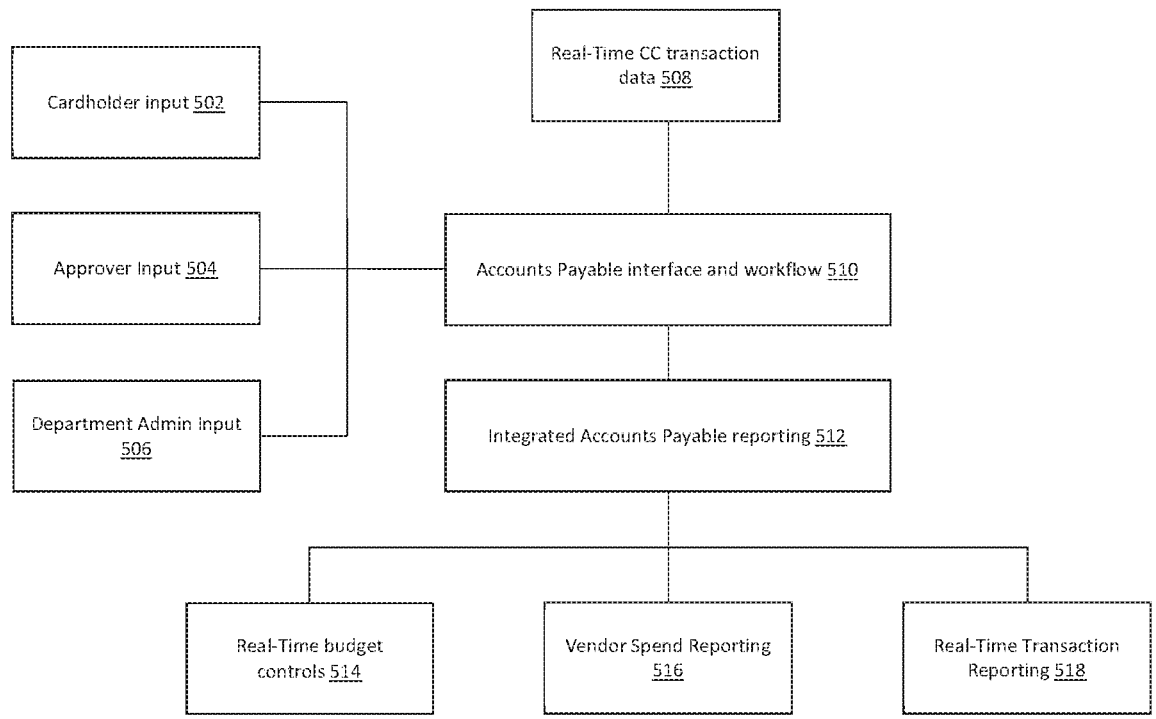
FIGURE 5: System Routines (500)

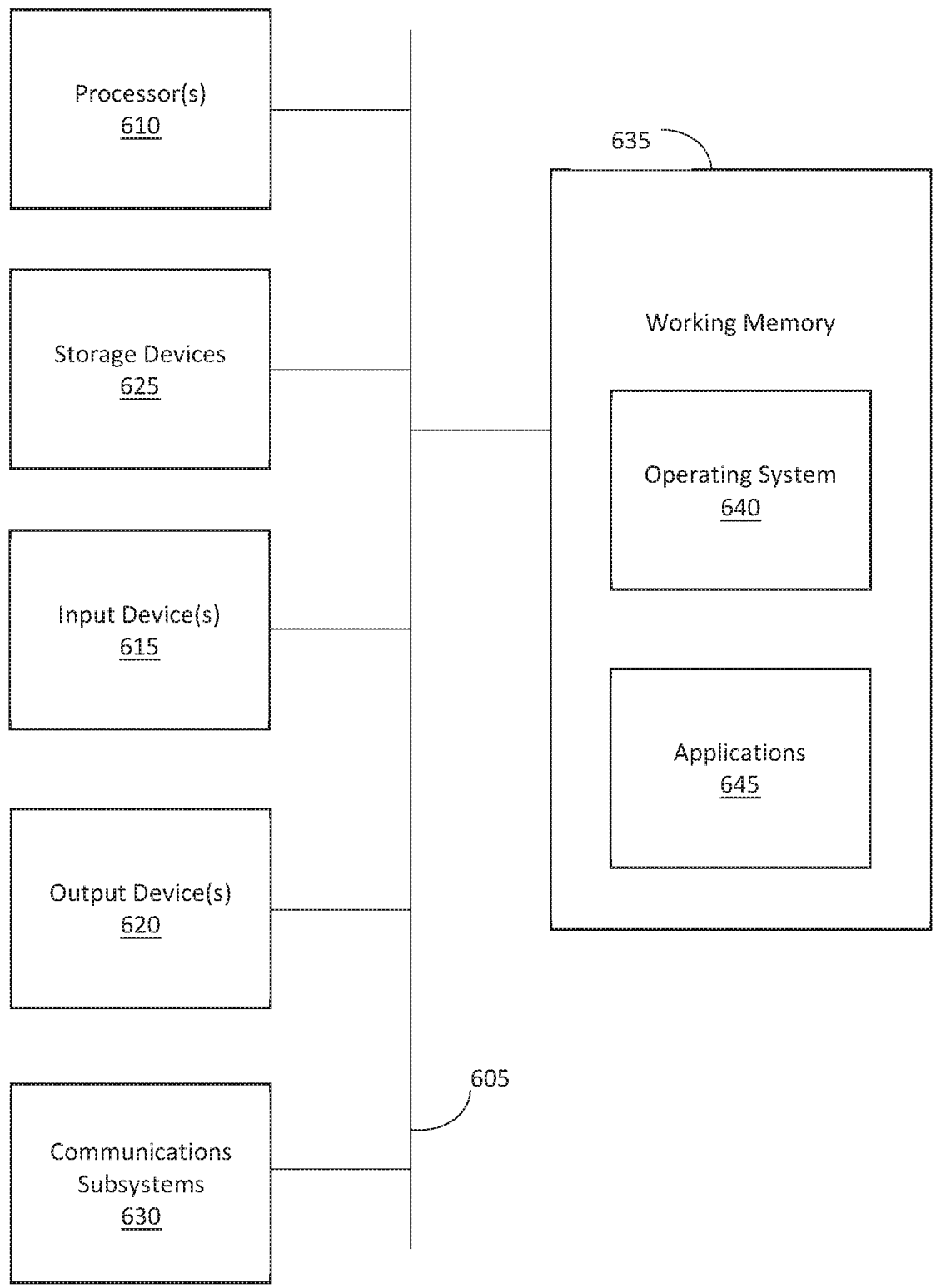
FIG. 6: COMPUTER SYSTEM (600)

SYSTEM AND METHOD FOR REAL-TIME INTEGRATED CREDIT CARD MANAGEMENT

CROSS-REFERENCE TO RELATED APPLICATIONS

The present application claims the benefit of U.S. Provisional Application 62/628,087 filed on Feb. 8, 2018 and entitled "SYSTEM AND METHOD FOR REAL-TIME INTEGRATED CREDIT CARD MANAGEMENT," the disclosure of which is hereby incorporated in its entirety at least by reference.

FIELD

The present disclosure relates to improvements in the technical field of credit card management systems; in particular, a system and method for managing credit card transactions across a plurality of users in real-time within an integrated accounting environment.

BACKGROUND

Credit card transactions are becoming an ever more prevalent method of making purchases by non-profit organizations, particularly small purchases of consumer type items needed on an immediate basis. Organizations need to maintain control and visibility over the continuously growing volume of these transactions. While numerous solutions exist to provide organizations with various means of importing credit card transactions into computer-based accounting applications, these solutions fail to provide real-time integration of credit card transactions within an accounts payable system, and require disconnected workflows between various stakeholders. Examples of such workflows include time consuming manual processes for tracking cardholders, receipts, and reconciling credit card transactions. Due to a lack of effective integration between prior art credit card management solutions and computer-based accounting applications, many organizations wait until a credit card statement is received at the end of each month to record credit card expenses within their accounting system. This results in lost receipts and delays to month-end close procedures. In addition, cardholders often do not have an efficient solution to record expense details and information. Likewise, it is inefficient for organizations to track spending by vendor within an integrated and scalable environment.

While numerous solutions exist to track credit card spending, these solutions fail to provide a meaning solution to integrate disparate user roles and accounting functions within an integrated credit card management system.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

An object of the present disclosure is a novel system for real-time visibility for a plurality of credit card transactions within an accounts payable system, such that a user has the ability to view activity against a credit card account record, register, and vendor record.

Another object of the present disclosure is a novel system for integrating credit card transaction data within an organizational accounting system, such that a user can assign a vendor association to desired transaction data.

Another object of the present disclosure is an improvement to credit card management systems to automate workflows between various users in an accounting environment, such that the system enables coding for default accounts, projects, and grant distributions, as well as attaching receipts, and creating invoices and refunds on vendor records.

Specific embodiments of the present disclosure provide for a method for managing a plurality of credit card transactions in real-time within an integrated accounting environment, the method comprising: inputting, with at least one input/output device operably engaged with a graphical user interface being configured to communicate data to at least one application database, a plurality of credentials associated with one or more credit card accounts; establishing, with a first server executing an application programming interface, a communications pathway between at least one financial institution database and the at least one application database, the at least one financial institution database being associated with the one or more credit card accounts; communicating in real-time, via the first server executing the application programming interface, credit card transaction data from the at least one financial institution database to the at least one application database; storing the credit card transaction data in the at least one application database, the at least one application database being integrated with at least one financial accounting application, the at least one financial accounting application being operable to configure a plurality of accounts payable parameters within the at least one application database, and communicate accounts payable data to the at least one application database; and, displaying, via a graphical user interface, an integrated view of the credit card transaction data and the accounts payable data according to the accounts payable parameters.

Further specific embodiments of the present disclosure provide for a computerized system for integrated credit card management within a computerized financial accounting application comprising an application server comprising an application database, the application server being communicably engaged with at least one financial institution server over a communications network, the application server comprising a processor and a non-transitory memory device operable to cause the processor to perform one or more operations, the one or more operations comprising configuring a plurality of credit card account parameters being associated with a plurality of credit card accounts within a graphical user interface; configuring a plurality of credit card management parameters within the graphical user interface, the plurality of credit card management parameters defining at least one distribution set, at least one vendor record, and at least one credit card register; establishing, for each credit card account within the plurality of credit card accounts, a data transfer interface with the at least one financial institution server; configuring a plurality of containers in the application database, each container in the plurality of containers being associated with at least one credit card account in the plurality of credit card accounts, and the plurality of credit card management parameters; initiating a data transfer protocol with the financial institution server to receive a plurality of credit card transaction data; storing the plurality of credit card transaction data within the plurality of containers in the application database; assigning, in the application database, an attribute to each credit card transaction in the plurality of credit card transaction data, the attribute being associated with at least one credit card management parameter in the plurality of credit card management parameters; associating the plurality of credit card transaction data with the at least one vendor record; and, generating an invoice associated with the plurality of credit card transaction data according to the at least one distribution set and at least one vendor record.

Further specific embodiments of the present disclosure provide for a computerized system for integrated credit card management within a computerized financial accounting application comprising an application server comprising an application database, the application server being communicably engaged with at least one financial institution server over a communications network, the application server comprising a processor and a non-transitory memory device operable to cause the processor to perform one or more operations, the one or more operations comprising: providing a graphical user interface for a plurality of user modules comprising a cardholder module, an approver module, a department administrator module, and an accounts payable module; configuring, within the cardholder module, a plurality of credit card account parameters being associated with a plurality of credit card accounts; establishing, for each credit card account within the plurality of credit card accounts, a data transfer interface with the at least one financial institution server; configuring, within the approver module, a plurality of credit card management parameters being associated with a plurality of credit card accounts, the plurality of credit card management parameters comprising one or more attributes, the one or more attributes comprising vendor attributes and distribution set attributes; configuring a plurality of containers in the application database, each container in the plurality of containers being associated with at least one credit card account in the plurality of credit card accounts, and the plurality of credit card management parameters; initiating a data transfer protocol with the financial institution server to receive a plurality of credit card transaction data; assigning, within the cardholder module, the one or more attributes to one or more credit card transaction within the plurality of transaction data; approving, within the department administrator module, the one or more attributes assigned to the one or more credit card transaction within the plurality of transaction data; storing the one or more attributes in the plurality of containers in the application database; and, providing, within the accounts payable module, a reporting interface comprising one or more real-time budget controls, vendor spending reports, and real-time transaction reports.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 1 is a functional block diagram of a credit card management method, in accordance with various embodiments;

FIG. 2 is a diagrammatic flow chart of the overall system arrangement, in accordance with various embodiments;

FIG. 3 is a process flow diagram of routines employed by a credit card management system, in accordance with various embodiments;

FIG. 4 is a process flow diagram of routines employed by a credit card management system, in accordance with various embodiments;

FIG. 5 is a process flow diagram of routines employed by a credit card management system, in accordance with various embodiments; and, FIG. 6 is a generalized schematic diagram illustrating a computer system, in accordance with various embodiments.

DETAILED DESCRIPTION

Overview Information

Embodiments of the present disclosure relate to an integrated credit card management system that enables integration between financial institutions, organizational accounting systems, and disparate user workflows to overcome deficiencies of the prior art. Specific embodiments enable tracking of credit card charges, credits, and payments directly within an accounts payable interface—enabling a user to view activity on the credit card account record, register, and vendor record. The system is operable to establish a real-time data transfer protocol between a financial institution and an organizational accounting application to integrate transaction data in real-time, define vendor association for transactions, and create a real-time credit card register to drive decision making across disparate user roles. Routines of the system further enable disparate users to code transactions across default account, project, and grant distributions, as well as attach receipts, and create invoices and refunds on vendor records.

Embodiments of the present disclosure enable numerous specific advancements over the prior art. For example, routines of the present disclosure enable advanced, real-time data associations between credit card transactions in the bank register and vendor and credit card records. Such associations eliminate the need for manual data entry and ensure accurate bank reconciliation. Real-time integration eliminates the need for ad hoc data export/import, thereby enabling automated workflows and real-time reporting across disparate user roles. Dynamic graphical user interfaces enable the manipulation of database elements and business logic to configure distribution sets for account, project, and grant distributions on system-generated invoices; and provide accurate insight into vendor spending including refunds and charges.

Prior art credit card management solutions fail to provide effective integration between credit card transaction data and financial accounting applications. Prior art solutions require credit card charges to be entered into an organization's financial accounting application once the account statement is generated and received at month's end. This creates an influx of work at the end of the month, adding to the many end-of-month processes for non-profits and other organizations. In the case of non-profit organizations, this increases the administrative burden of managing grant reimbursements and prolongs liability for expenditures. When bank reconciliation issues arise, lack of effective integration makes it more difficult to find the source transaction between the credit card statement and the specific line item on an unknown vendor record. Each month, all of the credit card charges need to be manually entered as invoices or line items under the credit card vendor with specific and varying general ledger ("GL"), project, and grant distributions. This increases the likelihood of coding errors and negatively impacts data integrity.

Embodiments of the present disclosure seek to provide improved methods of integrating credit card transaction data and financial accounting data across disparate user workflows in a financial accounting application. In the context of an accounts payable ("AP") user, invoices are created automatically as the system integrates charge data. This enables AP users to select pre-configured default GL, project, and grant distributions—reducing the risk of error and improving data integrity. This also enables AP users to decrease carried-over liability for grant reimbursements. When reconciliation issues arise, integration between the transaction data and vendor records enables efficient resolution.

Through applicant's applied effort and ingenuity, the present invention contributes to useful improvements in the technical fields of real-time transaction management, disparate user interactions in credit card management systems, and integrated database and application design in credit card management systems.

System Diagrams and Process Flowcharts

Referring now to FIG. 1, a functional block diagram of an integrated credit card management method 100 is shown. In accordance with various embodiments, method 100 is operable to integrate credit card transaction data and financial accounting data across disparate user workflows in a financial accounting application. Representative user workflows in an integrated credit card management system include cardholders 102, approvers 104, department administrators 106, and AP processors 108. Cardholders 102 are representative of each authorized user across one or more credit card accounts. Cardholders 102 generate credit card transaction data as credit card purchases are transacted. Approvers 104 review and approve credit card transaction data created by cardholders 102, and may configure one or more approval workflows for execution by cardholders 102 and/or department administrators 106. Department administrators 106 may be responsible for reviewing transactions by cardholders 102 within the same department, as defined within method 100. Department administrators 106 may serve as proxies for cardholders 102 between approvers 104 and AP processors 108.

User workflows may comprise manual credit card setup 110, data import and aggregation 112, AP processor data entry 114, department admin data entry and notifications 116, cardholder data entry 118, approver workflow 120, mobile application 122, and requests 124. Manual credit card setup 110 may comprise entering, via a graphical user interface, one or more credit card accounts into an integrated credit card management system. If more than one credit card account is entered into the system, the system prompts a credit card configuration workflow. The user configures data import and aggregation 112 workflow to facilitate automated download of credit card transaction data from financial institution servers. The data import and aggregation 112 workflow populates the transactions in the system for coding or entry by AP processor 108 according to AP processor data entry 114 workflow. Department admin data entry 116 workflow is prompted by one or more notifications pursuant to AP processor data entry 114 workflow. Department administrators 106 execute department admin data entry 116 workflow via an employee portal interface, which facilitates the data entry model for non-financial users. Department administrators 106 correspond to the department groups as configured in the system. Each department group is assigned a department administrator 106, and each department administrator 106 is assigned one or more credit card accounts and cardholders 102 corresponding with their department. Department admin data entry 116 workflow prompts review and data entry for the credit card transaction data corresponding with the applicable department. Department administrator 106 configures the notifications and workflow for cardholder data entry 118. Cardholders 102 complete cardholder data entry 118 to upload receipts and submit charges associated with credit card transactions. Cardholder data entry 118 prompts approver workflow 120. Approver workflow 120 prompts review and approval of cardholder data by approver 104, and further comprises steps to configure the business logic for each user workflow and permissions with respect to data visibility for user roles. Mobile application 122 provides for enhanced data entry, including image capture and optical character recognition, for data elements such as transaction receipts. Requests 124 incorporates data entry from prior workflow steps to drive decision making and influence behavior across users. This includes requests to spend, reimbursement requests, expense tracking, and pre-purchase approval. Method 100 provides for integration of disparate users and user workflows to solve for manual credit card transaction integration, credit card management within an AP workflow, proxy management, cardholder management and data entry, and expense management/approval.

Referring now to FIG. 2, a diagrammatic flow chart of an integrated credit card management system 200 is shown. In accordance with various embodiments, system 200 is comprised of application server 202 and application database 212. Application server 202 is configured to execute an integrated set of disparate workflows across cardholder interface 204, approver interface 206, department admin interface 208, and AP processor interface 210. Application server 202 is operably engaged with financial institution server 216 via an application programming interface (API) and/or software development kit (SDK) 214. API/SDK 214 may comprise a third-party application that may function as a communication pathway between application database 212 and financial institution database 220. Application server 202 communicates with financial institution server 216 to receive the credit card transaction data stored in financial institution database 220 from credit card transaction gateway 218. Credit card transaction data is communicated from financial institution server 216 to application server 202 via API 214 and is stored in application database 212. Application database 212 is configured to integrate credit card transaction data with other financial accounting data. Application server 202 and API 214 are configured such that credit card transaction data being communicated by credit card transaction gateway 218 to financial institution database 220 is communicated to application server 202 in real-time.

Cardholder interface 204, approver interface 206, department admin interface 208, and AP processor interface 210 are operable to configure and execute user workflows for managing credit card transaction data and enabling integrated management of credit card transactions. As discussed in more detail in FIG. 1 above, cardholder interface 204 is operable to configure and execute the cardholder workflow; approver interface 206 is operable to configure and execute the approver workflow; department admin interface 208 is operable to configure and execute the department admin workflow; and AP processor interface 210 is operable to configure and execute the AP processor workflow. Cardholder interface 204, approver interface 206, department admin interface 208, and AP processor interface 210 are further operable to enable the system routines described in FIGS. 3-5, below.

Referring now to FIG. 3, a process flow diagram of a routine 300 employed by an integrated credit card management system is shown. In accordance with various embodiments, routine 300 is operable to establish a real-time data transfer interface between an accounting application and a financial institution for credit card transaction data. A user inputs data associated with one or more credit card accounts into an accounting application configured to execute a plurality of integrated credit card management workflows 302. The accounting application establishes a credit card data transfer interface 308 via one or more APIs or SDKs and defines real-time data transfer protocols within said interface 308. The accounting application is linked to the financial institution associated with the one or more credit card accounts 304 via the credit card data transfer interface 308. One or more credit card management protocols are configured in the accounting application 306 such that credit card transaction data received from the financial institution is integrated into one or more user workflows. The system establishes real-time data transfer protocols 310, which are executed via credit card data transfer interface 308, and credit card transaction data is communicated from the financial institution to the accounting application database 312 in real-time. The accounting database defines the containers for the credit card transaction data 314 and integrates the credit card transaction data with the other financial data in the application database. An AP interface is operable to display the integrated credit card transaction data to an AP user 316, such that the AP user can execute an AP processor workflow.

Referring now to FIG. 4, a process flow diagram of routines 400 employed by integrated credit card management system 100 is shown. In accordance with an embodiment, various routines across department admin users, cardholder users, and approver users are executed to enable integrated management of credit card transactions for an AP processor, and provide real-time visibility into credit card transactions to inform decision-making and influence spending behavior. A department admin user routine is initiated by user validation 402 within a department admin interface. Department admin workflow is initiated and transaction data and workflow steps are displayed via a graphical user interface 406, pursuant to application and database logic 404. The department admin user executes the department admin workflow 408, which includes review and treatment of transaction data associated with linked credit card holders. The department admin user may approve transaction data and request additional cardholder data input 410. The application logic is updated in the application server to configure the cardholder workflow in accordance with the department admin user data request 412. The application server stores the department admin data entry in the application database 414. The department admin data is then integrated into the AP processor workflow according to application logic 416.

A cardholder user routine is initiated by user validation 418 within a cardholder interface pursuant to application and database logic 404. Cardholder workflow is initiated and transaction data and workflow steps are displayed via a graphical user interface 420. Cardholder interface includes alerts and notifications 430 configured by an approver workflow. The cardholder user views credit card transaction data 420 and cardholder workflow requests 424 within the cardholder interface. The cardholder inputs the requested data pursuant to the cardholder workflow and department admin requests 426. The cardholder data entry is then stored in the application database 428.

An approver user routine is initiated by user validation 432 within an approver interface pursuant to application and database logic 404. Approver workflow is initiated and transaction data and workflow steps are displayed via a graphical user interface 434. Approver interface displays department administrator and cardholder data entry 436. Approver may configure department administrator and cardholder workflows within approver interface 438. Approver executes approver workflow 440 to specify treatment and permissions for department administrator and cardholder data. The system updates database and application logic pursuant to approver inputs 442, and the resulting approver data is then integrated into the AP processor workflow according to application logic 416.

Referring now to FIG. 5, a process flow diagram of routines 500 employed by integrated credit card management system 100 is shown. In accordance with an embodiment, an integrated credit card management system delivers real-time credit card transaction data 508 and a plurality of dynamic user inputs comprising cardholder inputs 502, approver inputs 504, and department admin inputs 506 to assemble an integrated accounts payable interface and workflow 510. An AP user executes accounts payable workflow 510 and the integrated credit card management application logic is configured to assemble a plurality of integrated accounts payable reports 512. User behavior may be influenced through the system via real-time budget controls 514, vendor spending reporting 516, and real-time transaction reporting 518.

Still referring generally to FIG. 5, embodiments of the present disclosure enable the following integrated credit card management functions:

Credit card account management: add accounts; one statement per card; one statement for all cards; credit card management under Payables; record charges; filters; search; GL distribution;

Advanced data input and associations: add attachments; record personal expenses; record payments; record refunds;

link vendor to adjustment; match refund to original transaction; save transactions and disregard transactions; reporting and security permissions;

Advanced management configurations: combination of accounts; linking existing accounts; set up adjustment category for personal expenses (default GL distribution); set up adjustment category for refunds; set up vendor categories;

Bespoke accounting configurations: add statement periods and allow user to switch between statement periods; totals for charges and payments/credits; credit card reconciliation;

Expense management: user setup and permissions; approver rule settings;

Disparate user roles and interfaces: cardholder view—different statuses, relationship between expense categories and GL distributions, notification of rejected charges; Approver view—improved data integrity for accounting, verification of spending against budget; Accounts payable view—able to understand the current state of all transactions, bulk record transactions; and, Real-time visibility: notifications (email); notifications (system); reporting; invoice requests; reimbursements.

FIG. 6 provides a schematic illustration of one embodiment of a computer system 600 that can perform the methods provided by various other embodiments, as described herein, and/or can function as the user device(s) or server(s) described above. It should be noted that FIG. 6 is meant only to provide a generalized illustration of various components, of which one or more (or none) of each may be utilized as appropriate. FIG. 6, therefore, broadly illustrates how individual system elements may be implemented in a relatively separated or relatively more integrated manner.

The computer system 600 is shown comprising hardware elements that can be electrically coupled via a bus 605 (or may otherwise be in communication, as appropriate). The hardware elements may include one or more processors 610, including without limitation one or more general-purpose processors and/or one or more special-purpose processors (such as digital signal processing chips, graphics acceleration processors, and/or the like); one or more input devices 615, which can include without limitation a mouse, a keyboard and/or the like; and one or more output devices 620, which can include without limitation a display device, a printer and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 600 might also include a communications subsystems 630, which can include without limitation a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystems 630 may permit data to be exchanged with a network (such as the network described below, to name one example), with other computer systems, and/or with any other devices described herein. In many embodiments, the computer system 600 will further comprise a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure and/or adapt a general-purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

As mentioned above, in one aspect, some embodiments may employ a computer system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operation in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 625.

Volatile media includes, without limitation, dynamic memory, such as the working memory 635. Transmission media includes, without limitation, coaxial cables, copper wire and fiber optics, including the wires that comprise the bus 605, as well as the various components of the communication subsystems 630 (and/or the media by which the communications subsystems 630 provides communication with other devices). Hence, transmission media can also take the form of waves (including without limitation radio, acoustic and/or light waves, such as those generated during radio-wave and infra-red data communications).

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals and/or the like, are all examples of carrier waves on which instructions can be encoded, in accordance with various embodiments of the invention.

The communications subsystems 630 (and/or components thereof) generally will receive the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a storage device 625 either before or after execution by the processor(s) 610.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A computerized method for managing a plurality of credit card transactions, the method comprising:
   providing, with an application server via a communications network, remote access to a graphical user interface to one or more users, the one or more users comprising a cardholder user, an approver user and an accounts payable user;
   inputting, by the one or more users via the graphical user interface, a plurality of credentials associated with one or more credit card accounts;
   receiving, with the application server via the communications network, the plurality of credentials associated with one or more credit card accounts;
   establishing, with the application server via an application programming interface, a communications interface between at least one financial institution database and at least one application database, wherein the at least one financial institution database is associated with the one or more credit card accounts;
   communicating in real-time, via the application server executing the application programming interface, credit card transaction data from the at least one financial institution database to the at least one application database;
   storing the credit card transaction data in the at least one application database, the at least one application database being integrated with at least one financial accounting application, the at least one financial accounting application being operable to configure a plurality of accounts payable parameters within the at least one application database, and communicate accounts payable data to the at least one application database;
   displaying, to the accounts payable user via the graphical user interface, an integrated view of the credit card transaction data, the accounts payable data according to the plurality of accounts payable parameters, and a vendor record;
   inputting, by the accounts payable user via the graphical user interface, one or more data inputs comprising one or more data entry or coding input for the credit card transaction data; and
   providing, with the application server in response to receiving the one or more data inputs by the accounts payable user, one or more real-time budget control or real-time transaction report to the one or more users via the graphical user interface.

2. The method of claim 1 further comprising establishing, with the application server, a container in the at least one application database, the container comprising the vendor record, a credit card account record, and a credit card register.

3. The method of claim 2 further comprising processing, via the application server, the credit card transaction data from the at least one financial institution database to establish a vendor association with an individual transaction in the credit card transaction data.

4. The method of claim 3 further comprising storing, in the at least one application database, the individual transaction in the container.

5. The method of claim 4 further comprising generating an invoice, via the at least one financial accounting application, by querying the container to retrieve the individual transaction, and applying the individual transaction to one or more distribution sets.

6. The method of claim 5 wherein the one or more distribution sets comprise account distribution, project distribution, and grant distribution.

7. A computerized system for integrated credit card management within a computerized financial accounting application comprising:
   an application server comprising an application database, the application server being communicably engaged with at least one financial institution server over a communications network, the application server comprising a processor and a non-transitory memory device operable to cause the processor to perform one or more operations, the one or more operations comprising:
   providing remote access to a graphical user interface to one or more users over the communications network, wherein the one or more users comprise a cardholder user, an approver user and an accounts payable user;
   receiving, from the one or more users via the graphical user interface, account credentials for a plurality of credit card accounts;
   configuring a plurality of credit card account parameters for the plurality of credit card accounts;
   configuring a plurality of credit card management parameters, the plurality of credit card management parameters defining at least one distribution set, at least one vendor record, and at least one credit card register;
   establishing, for each credit card account within the plurality of credit card accounts, a data transfer interface with the at least one financial institution server;
   configuring a plurality of containers in the application database, each container in the plurality of containers being associated with at least one credit card account in the plurality of credit card accounts, and the plurality of credit card management parameters;
   initiating a data transfer protocol with the at least one financial institution server to receive a plurality of credit card transaction data;
   storing the plurality of credit card transaction data within the plurality of containers in the application database;
   assigning, in the application database, an attribute to each credit card transaction in the plurality of credit card transaction data, wherein the attribute is associated with at least one credit card management parameter in the plurality of credit card management parameters;
   associating the plurality of credit card transaction data with the at least one vendor record;
   receiving, from the accounts payable user via the graphical user interface, one or more data entry or coding inputs for the plurality of credit card transaction data;
   generating an invoice associated with the plurality of credit card transaction data according to the at least one distribution set and the at least one vendor record; and
   providing the invoice associated with the plurality of credit card transaction data to the one or more users.

8. The system of claim 7 further comprising unassigning, in the application database, the attribute from a credit card transaction in the plurality of credit card transaction data.

9. The system of claim 7 further comprising generating a vendor activity record according to the attribute from each credit card transaction in the plurality of credit card transaction data.

10. The system of claim 7 further comprising generating an accounts payable workflow within an accounts payable module according to the plurality of credit card management parameters.

11. The system of claim 7 further comprising processing a transaction receipt associated with a credit card transaction.

12. The system of claim 11 further comprising storing transaction data associated with the transaction receipt in the application database.

13. The system of claim 9 wherein the vendor activity record is updated in real-time in response to the data transfer protocol with the at least one financial institution server.

14. A computerized system for integrated credit card management within a computerized financial accounting application comprising:
   an application server comprising an application database, the application server being communicably engaged with at least one financial institution server over a communications network, the application server comprising a processor and a non-transitory memory device operable to cause the processor to perform one or more operations, the one or more operations comprising:
   providing a graphical user interface for a plurality of user modules comprising a cardholder module, an approver module, a department administrator module, and an accounts payable module to one or more users, the one or more users comprising a cardholder user, an approver user, a department administrator user, and an accounts payable user;
   configuring, in response to at least one user-generated input from the cardholder user within the cardholder module, a plurality of credit card account parameters associated with a plurality of credit card accounts;
   establishing, for each credit card account within the plurality of credit card accounts, a data transfer interface with the at least one financial institution server;
   configuring, in response to at least one user-generated input from the approver user within the approver module, a plurality of credit card management parameters associated with a plurality of credit card accounts, the plurality of credit card management parameters comprising one or more attributes, the one or more attributes comprising vendor attributes and distribution set attributes;
   configuring a plurality of containers in the application database, wherein each container in the plurality of containers are associated with at least one credit card account in the plurality of credit card accounts and the plurality of credit card management parameters;
   initiating a data transfer protocol with the at least one financial institution server to receive a plurality of credit card transaction data;
   assigning, in response to the at least one user-generated input from the cardholder user within the cardholder module, the one or more attributes to one or more credit card transaction within the plurality of credit card transaction data;
   approving, in response to at least one user-generated input from the department administrator user within the department administrator module, the one or more attributes assigned to the one or more credit card transaction within the plurality of credit card transaction data;

storing the one or more attributes in the plurality of containers in the application database;

configuring, in response to at least one user-generated input from the accounts payable user within the accounts payable module, transaction entries or transaction codes for the credit card transaction data; and providing one or more real-time budget control or real-time transaction report to the one or more users via the graphical user interface.

15. The system of claim 14 wherein the initiating the data transfer protocol with the at least one financial institution server is initiated within the accounts payable module.

16. The system of claim 14 further comprising generating, within the accounts payable module, an invoice comprising the plurality of credit card transaction data and the plurality of credit card management parameters.

17. The system of claim 16 wherein the plurality of credit card management parameters comprise a grant distribution project.

18. The system of claim 16 wherein the plurality of credit card management parameters comprise a project distribution parameter.

19. The system of claim 16 wherein the plurality of credit card management parameters comprise an account distribution parameter.

20. The system of claim 14 wherein the plurality of credit card management parameters comprise a vendor account.

* * * * *